United States Patent [19]

Kobayashi et al.

[11] Patent Number: 4,865,425

[45] Date of Patent: Sep. 12, 1989

[54] POWER SOURCE DEVICE FOR DRIVING LIQUID CRYSTAL

[75] Inventors: Uruo Kobayashi, Tokyo; Youji Oki, Kawasaki; Katsunori Kawano, Tokyo, all of Japan

[73] Assignee: Stanley Electric Co., Ltd., Tokyo, Japan

[21] Appl. No.: 936,317

[22] Filed: Dec. 1, 1986

[30] Foreign Application Priority Data

Dec. 3, 1985 [JP] Japan .......................... 60-186578[U]

[51] Int. Cl.[4] ......................... G02F 1/13; G09G 1/28; G09G 3/00

[52] U.S. Cl. ................................ 350/345; 350/331 R; 350/332; 340/811; 340/702; 340/703

[58] Field of Search ................... 350/345, 331 R, 332; 340/811, 702, 703

[56] References Cited

U.S. PATENT DOCUMENTS

| | | | |
|---|---|---|---|
| 3,986,022 | 10/1976 | Hyatt | 350/331 R |
| 4,037,931 | 7/1977 | Ito et al. | 350/332 |
| 4,139,278 | 2/1979 | Matsumoto et al. | 350/331 R |
| 4,205,311 | 5/1980 | Kutaragi | 350/332 |
| 4,698,668 | 10/1987 | Milgram | 350/332 |

*Primary Examiner*—Stanley D. Miller
*Assistant Examiner*—Trong Quang Phan
*Attorney, Agent, or Firm*—Frishauf, Holtz, Goodman & Woodward

[57] ABSTRACT

A power source device for driving a liquid crystal device comprises an inverter for powering a back-light discharge lamp and a negative voltage power source generator for driving the liquid crystal device. The negative voltage generator is provided as part of the inverter. A step-up transformer of the inverter is commonly used as part of the negative voltage power source generator.

13 Claims, 1 Drawing Sheet

POWER SOURCE DEVICE FOR DRIVING LIQUID CRYSTAL

BACKGROUND OF THE INVENTION

1. Field of the Invention

The present invention relates to a power source device for a liquid crystal display unit used to display images on an instrument panel of an automobile, a television picture tube, etc., and more particularly to a power source device for a liquid crystal display unit such as a liquid crystal display unit of a dot matrix type, etc. which requires a high driving voltage and which therefore requires a negative power source for the purpose of driving same.

2. Description of the Prior Art

A liquid crystal display unit requires a high driving voltage. An integrated circuit (hereinafter referred to as IC) used in a circuit provided in the signal processing stage prior to the driving voltage stage (the signal processing stage processes the content of the display) is not matched with a power source voltage. In the prior art, when a liquid crystal display unit of this kind is driven, a special IC called a negative power source generating IC 10, as shown in FIG. 4, is used to obtain a negative polarity power source voltage which is applied to a liquid crystal driving IC 11 to effect matching of voltage with that of the liquid crystal display unit 1.

However, in the case where the aforementioned negative power source generating IC 10 is used, and exclusive-use special IC is required, and further circuit parts therefor are also required, thus inevitably increasing the cost. With the recent extensive market need for liquid crystal display units, wherein the number of matrix display units tends to be greatly multistaged, there is a need for higher power negative voltage power sources therefor. The negative voltage capable of being generated by the aforesaid negative voltage generating IC 10 is not enough to cover the aforesaid need, and a few of said ICs 10 need be connected in series, as a consequence of which the device further becomes expensive.

SUMMARY OF THE INVENTION

As a specific means for solving the problems noted above with respect to the prior art, the present invention provides a power source device for driving a liquid crystal display unit provided with a negative voltage generating device, characterized in that the negative voltage power source generating device is provided as part of an inverter which serves as a power source device for a light source used for the back illumination of the liquid crystal display unit, whereby a suitable negative voltage, as desired, may be easily obtained, and the manufacturing cost of a liquid crystal display unit including drive circuit parts is not affected by the requirement to provide a sufficient voltage to overcome the above-described prior art problems.

DETAILED DESCRIPTION OF THE INVENTION

Figure 4:
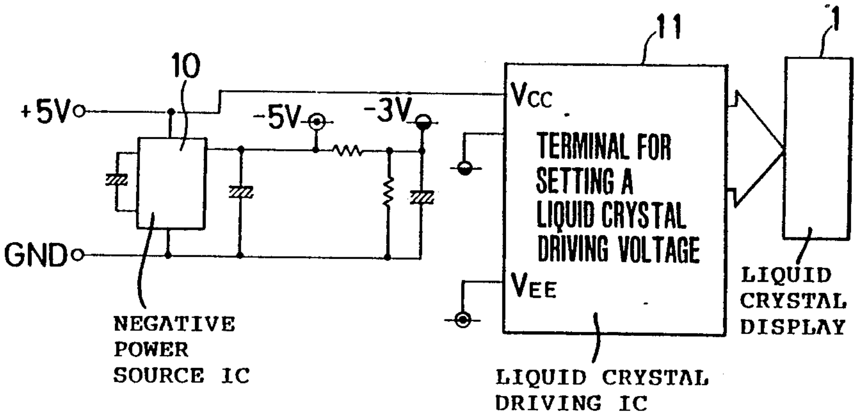
FIG. 4 ( PRIOR ART )
FIG. 4 is a circuit representation showing a prior art power source device.

The present invention will now be described in detail with reference to the drawings. For ease of understanding, parts similar to those of the prior art device of FIG. 4 are indicated by the same reference numerals.

A guest-host type or a dot matrix type liquid crystal display unit 1 is provided with a discharge lamp 2 for back illumination such as a cold cathode fluorescent tube which is superior in color rendering property to an incandescent bulb, and an illuminating device such as a reflecting mirror 3 adjacent thereto. The discharge lamp 2 cannot be normally lighted by a d.c. 12-volt power supply which is a source voltage of an automobile, and therefore there is provided an inverter 4 basically comprising an oscillation circuit and a step-up transformer to generate a sufficient voltage to light the discharge lamp 2.

Figure 1:
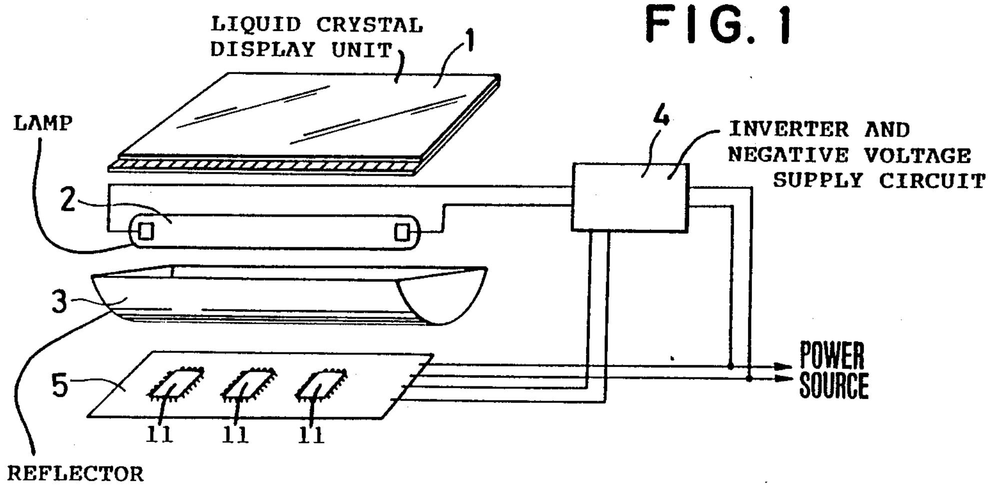
FIG. 1 is an explanatory view showing the schematic connection of a power source device for driving a liquid crystal according to the present invention.
Figure 2:
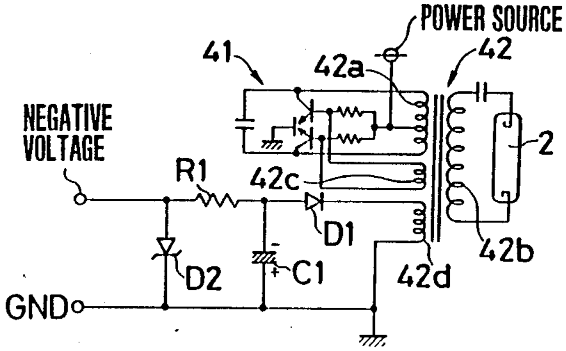
FIG. 2 is a circuit representation specifically showing one embodiment of a power source device for driving a liquid crystal also serving as an inverter according to the present invention.

FIG. 2 specifically shows an internal connection diagram of the inverter 4 according to the present invention, which also includes a negative voltage power source for the liquid crystal display. The inverter 4 comprises an oscillation circuit 41 provided in the conventional inverter, a primary winding **42*a* of a step-up transformer 42 to which is applied a power source voltage converted from d.c. to a.c. by said oscillation circuit 41, a secondary winding 42*b* which steps up the voltage of the primary winding 42*a* to form a voltage high enough to light said discharge lamp 2, a feedback winding 42*c* for said oscillation circuit 41, and a tertiary winding 42*d*. To the output of the tertiary winding 42*d* are connected a diode D1, a capacitor C1 and a resistor R1 which constitute a rectifier circuit so as to obtain a negative d.c. voltage. Further, a Zener diode D2 for regulating and stabilizing the negative d.c. voltage to the intended voltage is connected in parallel with the output of the rectifying circuit. With this arrangement, the intended negative d.c. voltage is obtained, and the thus obtained negative d.c. voltage is supplied to a printed substrate 5 on which liquid crystal driving ICs 11** as previously mentioned in the prior art embodiment are disposed.

Figure 3:
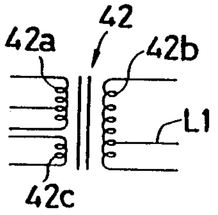
FIG. 3 is a circuit representation showing an example wherein an intermediate tap is provided in a secondary winding of a step-up transformer according to a further embodiment of the present invention.

In a modified embodiment of the present invention, an intermediate tap L1 is suitably provided at an intermediate position on the secondary winding **42*b* in place of the tertiary winding 42*d* of the step-up transformer 42, for example, as shown in FIG. 3. In such a modified embodiment, the rectifying circuit is connected to tap L1 instead of across tertiary winding 42*d***.

According to the present invention, a negative voltage power source generator is incorporated into a power source device (i.e., an inverter) for a discharge lamp for back illumination of a liquid crystal display unit, whereby a suitable negative d.c. voltage for the liquid crystal display unit may be obtained without use of any special IC or special circuit.

Since the liquid crystal display unit according to the present invention is viewed synthetically (i.e., with artificial back lighting provided by a lamp), a tertiary winding or an intermediate tap or the like is provided on the secondary winding of the inverter (which is a power source device for an indispersibly provided discharge lamp for back illumination), and a rectifier circuit to obtain a negative voltage is coupled to the tertiary winding or to the intermediate tap of the secondary winding to provide a suitable negative voltage without use of a special negative voltage generating IC as in the prior art, and without being restricted at all by a voltage generated by such a prior art IC. This increases the freedom and adaptability of the device in terms of design of circuits as well as enables provision of a liquid crystal driving power source device which is unexpensive and has an excellent performance by virtue of the joint use of parts.

What is claimed is:

1. A power source device for driving both a liquid crystal device with a DC negative voltage, and an AC driven light source arranged for illuminating said liquid crystal device, the power source device comprising:

an inverter circuit coupled to said light source for providing AC power to said light source for lighting said light source, said inverter circuit comprising:

a step-up transformer having at least a primary winding, a secondary winding, and a feedback winding; and an oscillator circuit coupled to said primary winding of said step-up transformer for supplying an AC voltage to said primary winding;

said secondary winding being coupled to said light source for providing an AC voltage to light said light source; and a negative voltage power source generator comprising:

a rectifier circuit coupled to said secondary winding of said step-up transformer for receiving an AC voltage therefrom, and for generating a negative DC voltage from said received AC voltage; and means for coupling said negative DC voltage to said liquid crystal device to drive said liquid crystal device;

said rectifier circuit of said negative voltage power source generator comprising diode means for rectifying said AC voltage.

2. The power source device of claim 1, wherein said light source is a discharge-type lamp.

3. The power source device of claim 2, wherein said discharge-type lamp is arranged for back illumination of said liquid crystal device.

4. The power source device of claim 1, wherein said light source is arranged for back illumination of said liquid crystal device.

5. The power source device of claim 1, wherein said rectifier circuit is coupled to at least a portion of said secondary winding of said step-up transformer.

6. The power source device of claim 5, wherein said secondary winding includes a tapped portion, said rectifier circuit being coupled to said tapped portion.

7. The power source device of claim 6, wherein said light source is a discharge-type lamp.

8. The power source device of claim 7, wherein said discharge-type lamp is arranged for back illumination of said liquid crystal device.

9. The power source device of claim 6, wherein said light source is arranged for back illumintion of said liquid crystal device.

10. A power source device for driving both a liquid crystal device with a DC negative voltage, and an AC driven light source arranged for illuminating said liquid crystal device, the power source device comprising:

an inverter circuit coupled to said light source for providing AC power to said light source for lighting said light source, said inverter circuit comprising:

a step-up transformer having at least a primary winding, a secondary winding, a feedback winding and a tertiary winding; and an oscillator circuit coupled to said primary winding of said step-up transformer for supplying an AC voltage to said primary winding;

said secondary winding being coupled to said light source for providing an AC voltage to light said light source; and a negative voltage power source generator comprising:

a rectifier circuit coupled to said tertiary winding of said step-up transformer for receiving an AC voltage therefrom, and for generating a negative DC voltage from said received AC voltage; and means for coupling said negative DC voltage to said liquid crystal device to drive said liquid crystal device;

said rectifier circuit of said negative voltage power source generator comprising diode means for rectifying said AC voltage.

11. The power source device of claim 10, wherein said light source is a discharge-type lamp.

12. The power source device of claim 11 wherein said discharge-type lamp is arranged for back illumination of said liquid crystal device.

13. The power source device of claim 10, wherein said light source is arranged for back illumination of said liquid crystal device.

* * * * *